United States Patent
Xia et al.

(10) Patent No.: US 11,048,391 B2
(45) Date of Patent: Jun. 29, 2021

(54) METHOD, SYSTEM AND COMPUTER PROGRAM FOR COPY AND PASTE OPERATIONS

(71) Applicant: INTERNATIONAL BUSINESS MACHINES CORPORATION, Armonk, NY (US)

(72) Inventors: Yin Xia, Beijing (CN); Lu Fu, Ningbo (CN); Bin Xu, Ningbo (CN); Jie Hu, Ningbo (CN); Xiao Lin Sun, Ningbo (CN); Zhang Yu Lin, Ningbo (CN); Lei Pan, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 16/239,223

(22) Filed: Jan. 3, 2019

(65) Prior Publication Data
US 2020/0218440 A1 Jul. 9, 2020

(51) Int. Cl.
| G06F 3/0484 | (2013.01) |
| G06F 3/0488 | (2013.01) |
| G06F 9/54 | (2006.01) |
| G06F 9/451 | (2018.01) |

(52) U.S. Cl.
CPC ...... G06F 3/04842 (2013.01); G06F 3/04883 (2013.01); G06F 9/451 (2018.02); G06F 9/543 (2013.01); *G06F 2203/04804* (2013.01)

(58) Field of Classification Search
CPC ... G06F 3/04842; G06F 3/04883; G06F 9/543
See application file for complete search history.

(56) References Cited

U.S. PATENT DOCUMENTS

| 5,651,107 A * | 7/1997 | Frank | G06F 3/0481 345/589 |
| 5,774,119 A * | 6/1998 | Alimpich | G06F 3/0486 715/764 |
| 6,411,312 B1 * | 6/2002 | Sheppard | G06F 3/0481 715/769 |

(Continued)

FOREIGN PATENT DOCUMENTS

| CN | 101763341 A | 6/2010 |
| WO | 2013178152 A1 | 12/2013 |

OTHER PUBLICATIONS

Carey, "How to Drag-Select Multiple Photos," Apr. 22, 2016, https://www.iphonelife.com/content/tip-day-how-drag-select-multiple-photos.*

(Continued)

*Primary Examiner* — Ryan Barrett
(74) *Attorney, Agent, or Firm* — Tutunjian & Bitetto, P.C.; Kurt Goudy (57) ABSTRACT

A computer-implemented method and a computer system are proposed. According to the method, one or more candidate target applications are obtained in response to determination of one or more pieces of source contents from one or more source applications. A target application is determined from the one or more candidate target applications, wherein the one or more candidate target applications are shown one by one in a pre-defined order. The one or more pieces of source contents are pasted into one or more target areas in response to determining the one or more target areas in the target application.

20 Claims, 6 Drawing Sheets

(56) References Cited

U.S. PATENT DOCUMENTS

| | | | | |
|---|---|---|---|---|
| 6,670,970 B1* | 12/2003 | Bonura | ............... | G06F 3/0481 715/768 |
| 7,546,545 B2* | 6/2009 | Garbow | ............... | G06F 3/0486 715/769 |
| 9,092,121 B2 | 7/2015 | Albouyeh et al. | | |
| 9,367,161 B2 | 6/2016 | Havilio | | |
| 2003/0007015 A1* | 1/2003 | Laffey | ............... | G06F 3/04842 715/860 |
| 2003/0007017 A1* | 1/2003 | Laffey | ............... | G06F 3/04812 715/862 |
| 2004/0261037 A1* | 12/2004 | Ording | ............... | G06F 3/0481 715/788 |
| 2006/0132455 A1* | 6/2006 | Rimas-Ribikauskas | | G06F 3/0414 345/173 |
| 2006/0161847 A1* | 7/2006 | Holecek | ............... | G06F 3/0481 715/716 |
| 2006/0168548 A1* | 7/2006 | Kelley | ............... | G06F 3/04812 715/857 |
| 2006/0242607 A1* | 10/2006 | Hudson | ............... | G06F 3/04817 715/863 |
| 2008/0109753 A1* | 5/2008 | Karstens | ............... | G06F 9/542 715/802 |
| 2009/0077501 A1* | 3/2009 | Partridge | ............... | G06F 3/017 715/846 |
| 2010/0192140 A1* | 7/2010 | Kamiyama | ............ | G06F 3/0482 717/167 |
| 2011/0107227 A1* | 5/2011 | Rempell | ............... | G06F 8/34 715/738 |
| 2011/0161875 A1* | 6/2011 | Kankainen | ............... | G06F 3/14 715/810 |
| 2011/0179368 A1* | 7/2011 | King | ............... | G06F 3/04815 715/769 |
| 2012/0030569 A1* | 2/2012 | Migos | ............... | G06F 3/04845 715/702 |
| 2012/0075341 A1* | 3/2012 | Sandberg | ............... | G06F 3/147 345/633 |
| 2012/0229511 A1* | 9/2012 | Irimoto | ............... | G06F 3/0481 345/634 |
| 2012/0311438 A1* | 12/2012 | Cranfill | ............... | G06F 3/0483 715/256 |
| 2013/0104065 A1* | 4/2013 | Stecher | ............... | G06F 3/0481 715/767 |
| 2013/0125043 A1* | 5/2013 | Jeon | ............... | G06F 3/0488 715/782 |
| 2013/0227472 A1* | 8/2013 | Sosinski | ............... | G06F 3/0481 715/794 |
| 2014/0137039 A1* | 5/2014 | Kroeger | ............... | G06F 3/04842 715/810 |
| 2014/0204119 A1* | 7/2014 | Malamud | ............... | G06T 19/006 345/633 |
| 2014/0258905 A1 | 9/2014 | Lee et al. | | |
| 2016/0041715 A1 | 2/2016 | Sirpal et al. | | |
| 2017/0016719 A1* | 1/2017 | Delfino | ............... | G06F 3/04817 |
| 2017/0371427 A1* | 12/2017 | Billau | ............... | G06F 3/038 |

OTHER PUBLICATIONS

ClipboardMASTER, "Multi-Clipboard," Jan. 22, 2015, https://web.archive.org/web/20150122202824/http://www.clipboardmaster.com/features/features-tour/multi-clipboard.html.*

ClipboardMASTER, "Simple Copying and Pasting," Apr. 23, 2016, https://web.archive.org/web/20160423081302/https://clipboardmaster.com/features/features-tour/simple-copying-and-pasting.html.*

ClipboardMASTER, "Clipboard Master Multi-Clipboard," Jan. 16, 2017, https://web.archive.org/web/20170116102815/https://clipboardmaster.com/main-features/multi-clipboard.html.*

Jain, "Copying files and folders to multiple destination folders in Windows using an Xcopy alternative replacement tool," Jan. 29, 2018, https://www.conceptworld.com/blog/index.php/copying-files-to-multiple-destination-folders-in-windows-using-an-xcopy-alternative-replacement-tool/.*

Anonymous, "A Gesture-based Mechanism for Text Selection on Touch Sensitive Screens", An IP Art Database Technical Disclosure, Dec. 2014, 8 pages.

Chapuis, "Copy-and-Paste Between Overlapping Windows", Proceedings of the SIGCHI Conference on Human Factors in Computing Systems, May 2007, pp. 201-210.

Anonymous, "Gestures for Human Interface Devices", An IP.com Prior Art Database Technical Disclosure, Jun. 2010, 3 pages.

* cited by examiner

METHOD, SYSTEM AND COMPUTER PROGRAM FOR COPY AND PASTE OPERATIONS

BACKGROUND

Technical Field

The present invention relates to operations on computing device, and more specifically, to operations of copy and paste.

Description of the Related Art

With the popularity of personal computers especially the touch screen devices, the device operability is important for users' experience. However, some operations, for example, the copy and paste operations on touch screen device are not convenient for users without help from external devices.

SUMMARY

This Summary is provided to introduce copy and paste operations that are further described herein in the Detailed Description. This Summary is not intended to identify key factors or essential features of the claimed subject matter, nor is it intended to be used to limit the scope of the claimed subject matter.

According to one embodiment of the present invention, there is provided a computer-implemented method. According to the method, one or more candidate target applications are obtained in response to determination of one or more pieces of source contents from one or more source applications. Then a target application is determined from the one or more candidate target applications, wherein the one or more candidate target applications are shown one by one in a pre-defined order. At last the one or more pieces of source contents are pasted into one or more target areas in response to determining the one or more target areas in the target application.

According to another embodiment of the present invention, there is provided another computer-implemented method. According to the method, one or more candidate source applications are obtained in response to determination a target area from a target application. Then a source application is determined from the one or more candidate source applications, wherein the one or more candidate source applications are shown one by one in a pre-defined order. At last one or more pieces of source contents are pasted into the target area in response to determining the one or more pieces of source contents in the source application.

Further, computer program products and systems are also provided according to embodiments of the present invention.

These and other features and advantages of the present invention will be described, or will become apparent to those of ordinary skill in the art in view of, the following detailed description of the example embodiments of the present invention.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Some embodiments will be described in more detail with reference to the accompanying drawings, in which embodiments of the present invention have been illustrated. However, the present invention can be implemented in various manners, and thus should not be construed to be limited to the embodiments disclosed herein.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of those of ordinary skill in the art to affect such feature, structure, or characteristic in connection with other embodiments whether or not explicitly described.

The present invention can be a system, a method, and/or a computer program product at any possible technical detail level of integration. The computer program product can include a computer readable storage medium (or media) having computer readable program instructions thereon for causing a processor to carry out aspects of the present invention.

Figure 1:
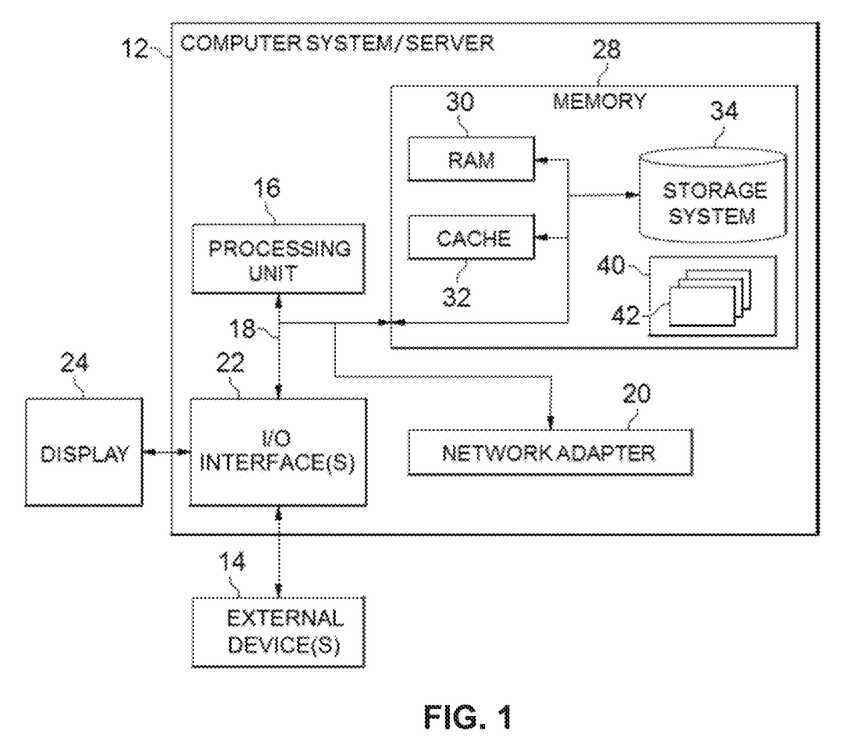
FIG. 1 shows an exemplary computer system which is applicable to implement the embodiments of the present invention.

Referring now to FIG. 1, in which an exemplary computer system/server 12, applicable for implementing the embodiments of the present invention, is shown. FIG. 1 also depicts an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing Units, external disk drive arrays, RAID systems, tape drives, and data archival storage systems, etc.

Conventionally, as mentioned above, the popularity of computers benefits people's work and life in many aspects, especially the usage of touch screen device brings a lot of conveniences. However, there are still some limitations, some operations can be hard to perform on a touch screen device without the help of external devices. Taking copy-paste operations as an example, copy-paste operations on a touch screen device are not convenient and straightforward. People need to, first, choose the content such as text, and copy it, then switch to the target application, and finally paste it into the target area. If there are many text strings needing to be copied and pasted, the copy-paste operations can become inconvenient. Furthermore, switching between two applications frequently can cause a crash on the device. Therefore a more efficient copy-paste operation is needed.

In order to at least in part solve the above mentioned and other potential problems, according to embodiments of the present invention, a new approach for implementing a copy-paste operation is proposed.

Some definitions are provided for better understanding of this invention. Hereinafter, "active application" refers to the application being used currently. "Paused application" refers to the application running on the background or suspending. "Not Running application" refers to an installed application that is not started up currently. "Source content" refers to the content to be copied and pasted. "Source application" refers to the application that the source content is copied from. "Target application" refers to the application into which the source content is pasted. "Target area" refers to the area in the target application into which the source content is to be pasted.

Figure 2:
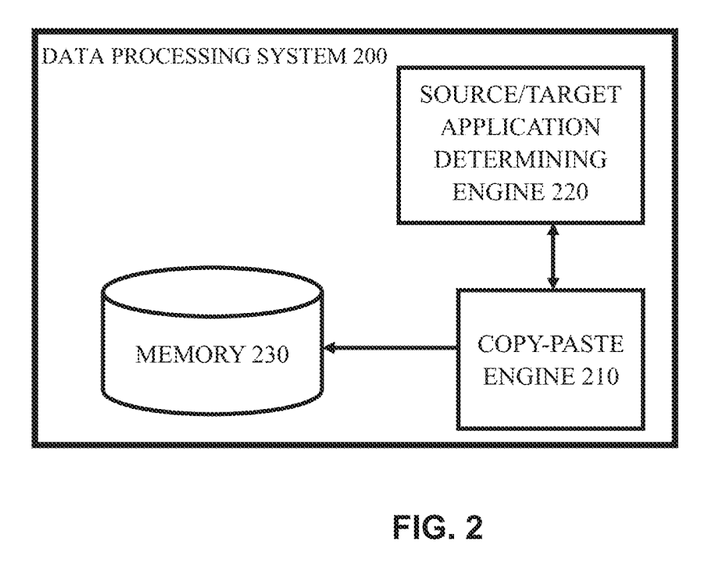
FIG. 2 is a schematic diagram of a data processing system in accordance with embodiments of the present invention.

With reference now to FIG. 2, FIG. 2 shows a schematic diagram of a data processing system 200 in accordance with embodiments of the present invention. Data processing system 200 can include copy-paste engine 210, Source/target application determining engine 220, and Memory 230.

In one embodiment, data processing system 200 can determine one or more pieces of source content, and paste them into one or more target areas in one or more target applications. In a further embodiment, copy-paste engine 210 can copy a source content in the active application. In some embodiments, copy-paste engine 210 can copy several pieces of non-continuous content in one or more source applications. Copy-paste engine 210 can be initiated various ways, subject to the design of operation system, and the user's usage habit, etc. In one embodiment, copy-paste engine 210 can be initiated when a user activates data processing system 200, for example, the user can activate data processing system 200 by double clicking on the screen. Alternatively, copy-paste engine 210 can be initiated automatically when a related software/application is loaded. After being initiated, copy-paste engine 210 can determine one or more pieces of source contents and save them into memory 230 automatically. In response to the source contents determination being completed, source/target application determining engine 220 is initiated. A target application can be determined by source/target application determining engine 220. A detailed description of an embodiment of the determining is provided with reference to FIGS. 3 to 6 below. In a further embodiment, one or more target areas can be determined by source/target application determining engine 220 too. In response to the one or more target areas being determined, the copied one or more pieces of source contents can be pasted into the one or more target areas automatically. A detailed description of an embodiment of the determining and pasting is provided with reference to FIGS. 3, 5 and 6 below.

In another embodiment, source/target application determining engine 220 can determine a target area first in an active application, and then determine one or more pieces of source content in one or more source applications. In a further embodiment, copy-paste engine 210 can determine a target area in the active application. In response to the determination being completed, source/target application determining engine 220 is initiated. Subsequently, one or more pieces of source content, in one or more source applications, can be determined by source/target application determining engine 220. A detailed description of an embodiment of the determining is provided with reference to FIGS. 4, 6 and 7 below. In response to the one or more pieces of source contents being determined, the determined one or more pieces of source content can be pasted into the target area automatically.

Figure 3:
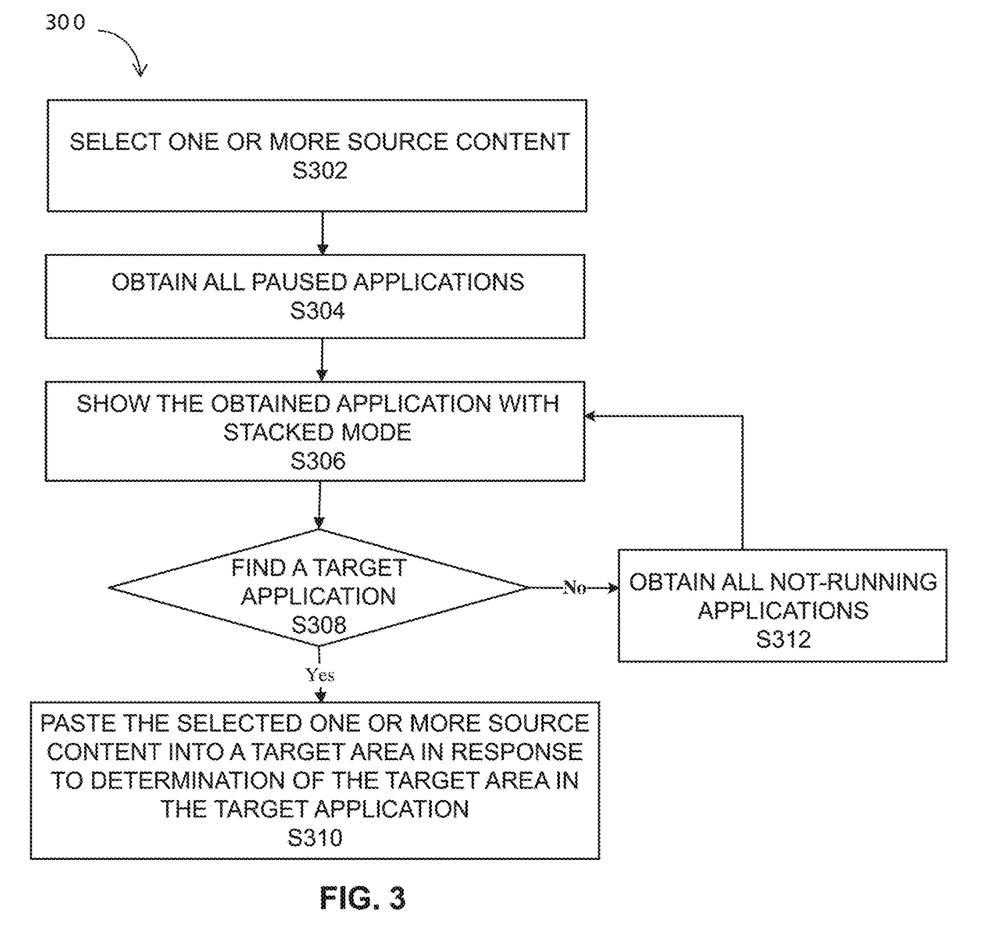
FIG. 3 shows a flowchart of a method for copy-paste operation in accordance with embodiments of the present invention.

With reference now to FIG. 3 which shows a flowchart of an exemplary method 300 for copy-paste operation according to certain embodiments of the present invention. The method 300 starts at block S302 in which one or more pieces of source content to be copied and pasted is selected, for example, in an active application. "966031" in FIGS. 5A-5D is an example of source content. In some further embodiments, several pieces of non-continuous content can be determined in block S302. For example, after completion of selecting a first content in a source application, the first content can be stored in memory 230, accordingly.

In some further embodiments, the first content can be stored in memory 230 by a special gesture, such as dragging the selected first content to any non-editable or non-writable area. Then the user can continue to select a second content in the same source application or in another source application, and the second content will also be saved in memory 230 by the same process. This step can be repeated to copy multiple pieces of content and save them in memory 230.

In some embodiments, some pre-defined ways can be used to determine if the selection is completed, such as, the user double clicks the screen, or the user presses a specific position on the screen, for example, the selected content on the screen, exceeding a pre-defined period, or with a pressure force reaching a pre-defined value. In a further embodiment, the selected one or more pieces of source content can be copied and saved in memory 230 directly in response to the selection. After selecting all content to be pasted, the method goes to block S304, in which all paused applications could be obtained. Then the method goes to block S306, where a stacked copy-paste procedure can be triggered accordingly. In block S306, all applications obtained in block S304 can be shown one by one in a pre-defined way automatically. The applications obtained in block S304 are candidate target applications.

Figure 5A:
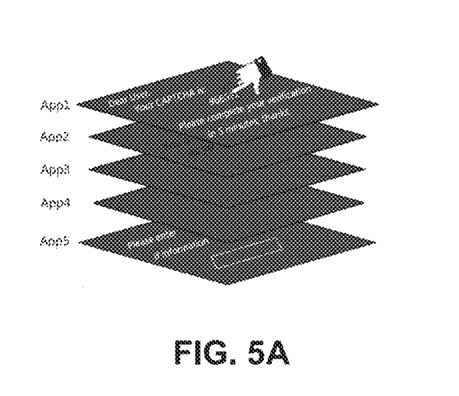
FIGS. 5A, 5B, 5C and 5D show an example of applications in stacked mode in accordance with embodiments of the present invention.

In one embodiment, all applications obtained in block S304 are shown underneath the source application, as shown in FIG. 5A. In a further embodiment, the applications can be stacked one by one in a pre-defined order, the pre-defined order can be determined based on at least one of: the length of latest active time of the applications obtained in block S304, the sequence of latest active time of the applications obtained in block S304, alphabetical order based on the name of the applications obtained in block S304, or the relationship of the applications obtained in block S304 and the one or more source applications.

Figure 5B:
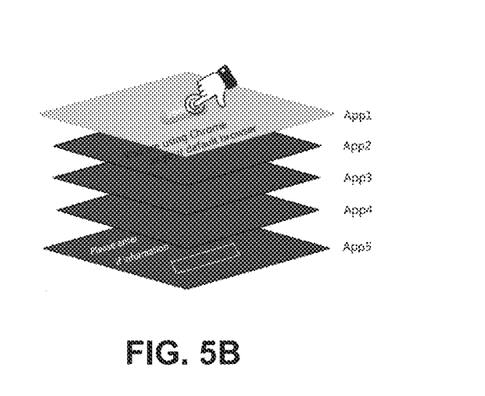

FIG. 5A shows an example of the source application and all the obtained applications in a stacked mode. In one embodiment, the user keeps touching the screen to show all the obtained applications one by one. In a further embodiment, the source application, for example, App 1 in FIGS. 5A-5D, can be made invisible, such as transparent or semi-transparent, in response to one or more pieces of source content selection being completed, and then the first paused application, for example, App 2 in FIGS. 5A-5D, can be displayed, as FIG. 5B shows. In an alternative embodiment, the previous application, for example, App 1 in FIGS. 5A-5D, can be removed instead of made invisible.

Figure 5C:
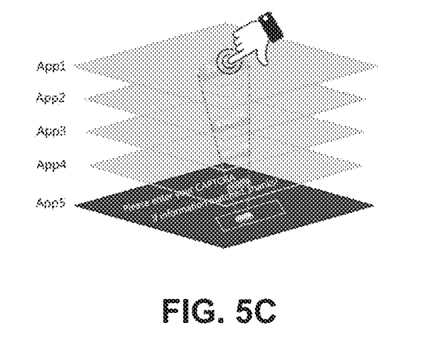
Figure 5D:
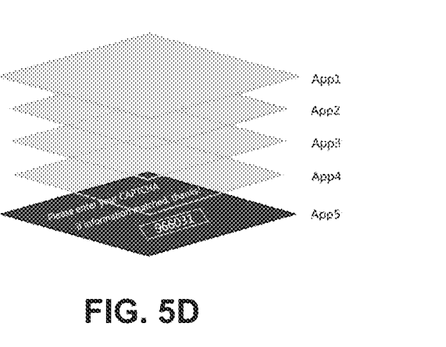

The method continues to block S308, which determines if a target application is found. A further description of block S308 is provided with reference to FIG. 6 below. If the answer is Yes, the method proceeds to block S310, in which an editable target area on the target application, for example, App 5 in FIG. 5C, is further determined, and the selected content can be pasted into the target area automatically in response only to the target area being determined. Thus, the selected one or more pieces of source content can be pasted into the target area directly once the target area is determined. In this way, the selected one or more pieces of source content can be pasted directly, without the need for receiving additional pasting instructions from the user.

In some embodiments, the user determines whether the current located area is the target area or not. In some embodiments, if the current located area, for example, the position where user's finger stays (or loosens) is an editable area, then the selected source content, for example, "966031" in FIG. 5D, can be automatically pasted into this editable target area, and the method 300 ends. In another embodiment, if the located area, such as the location the user's finger stays (or loosens), is not an editable area, the copy-paste engine will be in a waiting state until user selects an editable area in the target application, for example, by finger staying or clicking, etc. Once an editable area in the target application is identified, the selected one or more pieces of source content can be automatically pasted into this editable target area, and the method 300 ends. In this way, the candidate target applications can be obtained and shown automatically, and the user only needs to locate the target area, then the selected one or more pieces of source content can be pasted directly, the user can jump to the target application to paste the selected one or more pieces of source content directly from the source application without complex operation. A more convenient way for copy-paste operation with better user experience can be provided.

In some further embodiments, if the user selects several pieces of source content in block S302, then when the user selects, in block S310, a target area in the target application, all content stored in memory 230 can be shown on screen, and the user can select one or more pieces of source content for pasting into a target editable area. The selected source content can be pasted into the target editable area accordingly. Subsequently, the user can locate another editable target area in the target application, and select one or more pieces of source content. The selected one or more pieces of source content can be pasted into another editable target area automatically.

In a further embodiment, if the user needs to paste one or more pieces of source content into one or more target areas in another target application, the user can use some pre-defined gestures, such as clicking the screen three times, to trigger the stacked mode again and jump to a next application directly. The user can continue to choose another target application and paste the one or more pieces of source content into one or more target areas with the process described above. If the answer for the determination on block S308 is No, the method goes to block S312, in which all not-running applications can be obtained, and the method returns to block S306.

In some alternative embodiments, block S302 can be executed after block S306. In this case, after the user determines a source application, all paused applications can be obtained automatically. The source application and all paused applications can be shown in a stacked mode. The user can select one or more pieces of source content and copy them into the target application with the method described above, accordingly. In some alternative embodiments, the user can determine a target application first, and then go back to choose one or more pieces of source content to be pasted from a source application.

Figure 4:
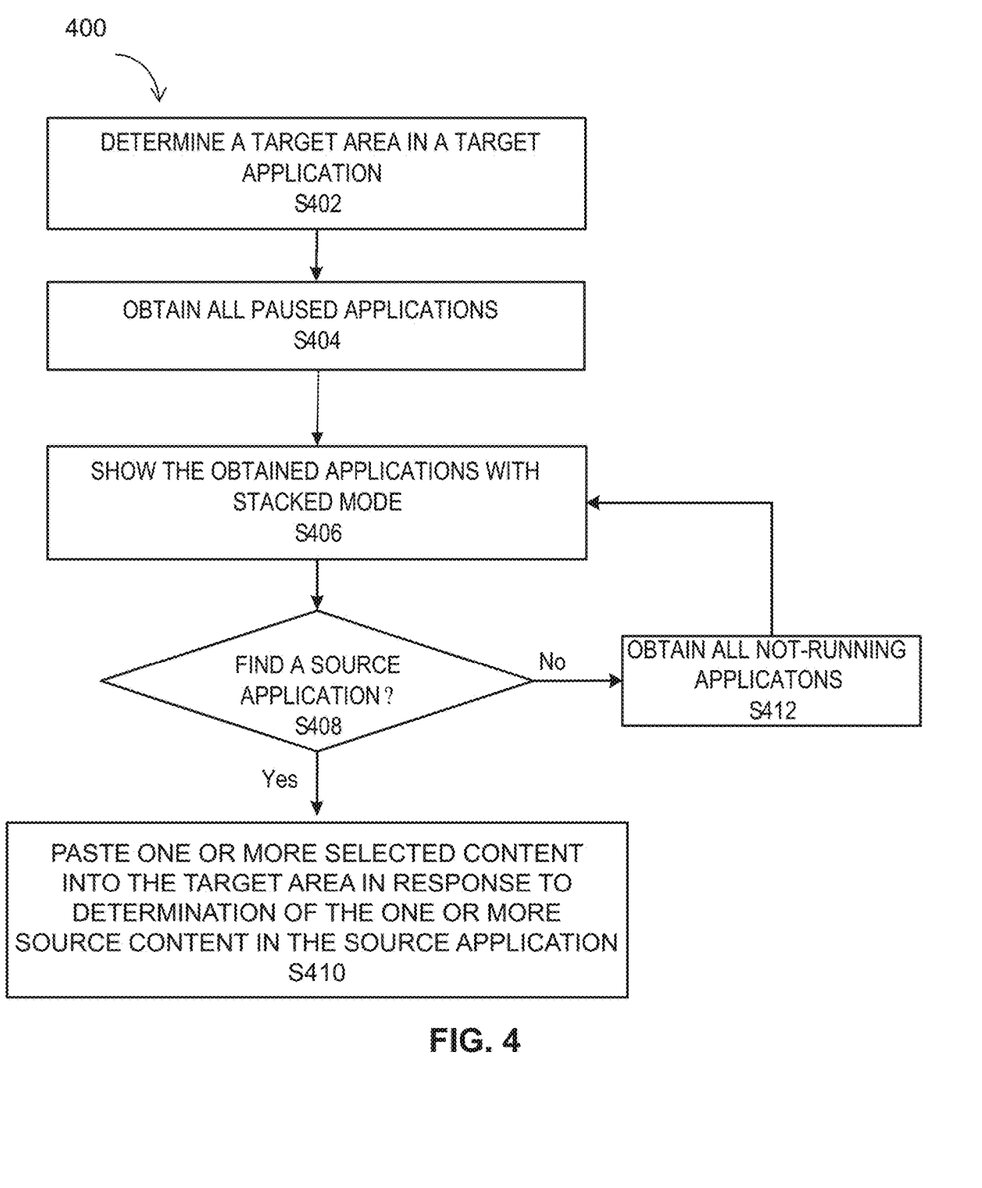
FIG. 4 shows another flowchart of another method for copy-paste operation in accordance with embodiments of the present invention.

With reference to FIG. 4, a flowchart of another exemplary method 400 is shown for a stacked copy-paste operation according to certain embodiments of the present invention. The method 400 starts at block S402 in which an editable target area is determined, for example, in an active application. In some embodiments, the user can determine whether the current located area is the target area or not. In some embodiments, if the current located area, for example, the position of the user's finger stays (or loosens), is an editable area, for example, the rectangular frame shown in FIG. 7A, and the user presses the current located area in excess of a pre-defined period or pre-defined pressure, the current located area can be determined as a target area.

The method goes to block S404, in which all paused applications are obtained in response to a target area being determined. All paused applications become candidate source applications accordingly. In block S406, the stacked mode is triggered, all applications obtained in block 404 are shown in a pre-defined way automatically. In one embodiment, all the applications obtained in block 404 are shown beneath the target application. In a further embodiment, the applications could be stacked one by one in a pre-defined order, the pre-defined order can be determined based on at least one of: the length of latest active time of the applications obtained in block 404, the sequence of latest active time of the applications obtained in block 404, the alphabetical order of the name of the applications obtained in block 404, or the relationship of the applications obtained in block 404 and the one or more source applications.

Figure 6:
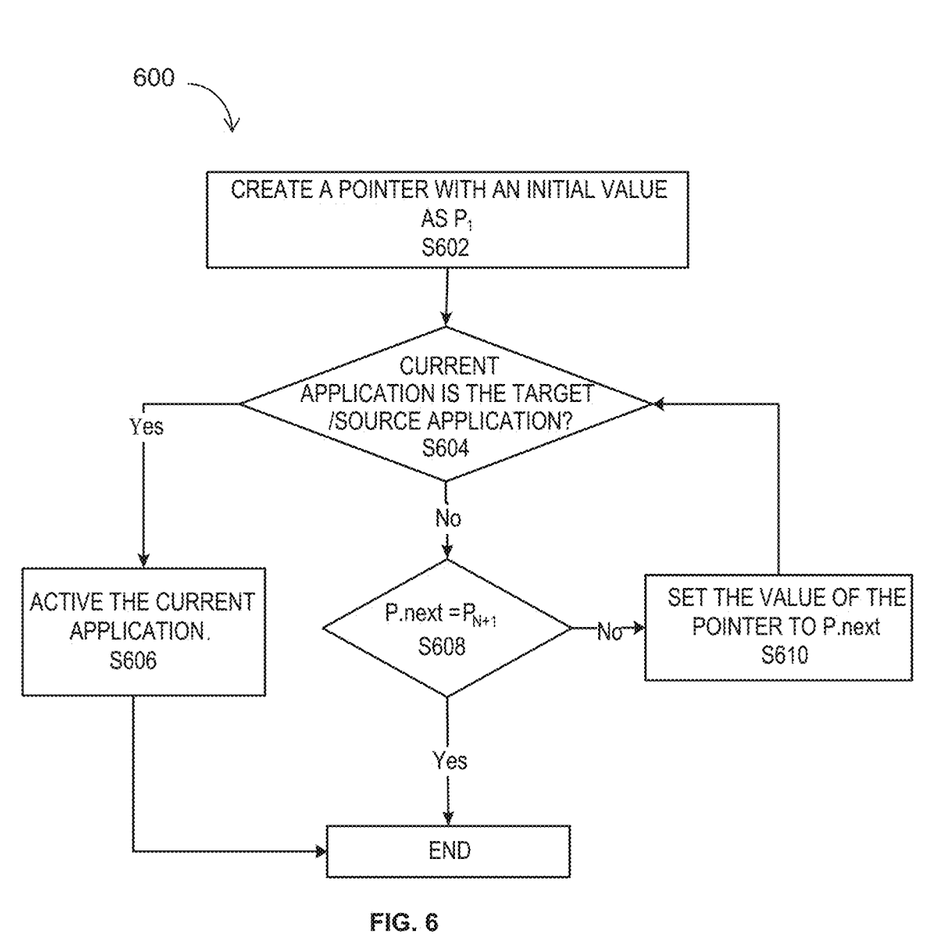
FIG. 6 shows a flowchart of a method for determining a target/source application in accordance with embodiments of the present invention.
Figure 7A:
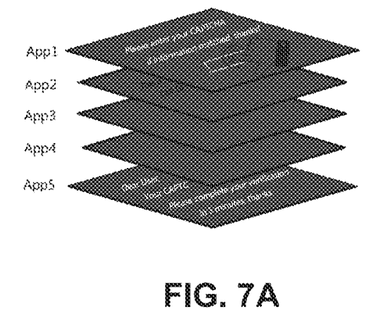
FIGS. 7A, 7B, 7C and 7D show another example of applications in stacked mode in accordance with embodiments of the present invention.
Figure 7B:
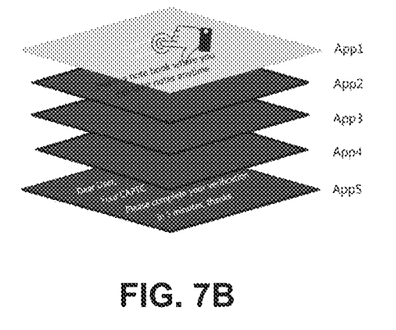

FIG. 7A shows an example of the applications in a stacked mode. In a further embodiment, the target application, for example, App1 in FIGS. 7A-7D, can be made invisible, such as transparent or semi-transparent, in response to a target area being determined, and the first paused application, for example, App2 in FIGS. 7A-7D, can be displayed as FIG. 7B shows. In an alternative embodiment, the previous application, for example, App1 in FIGS. 7A-7D, can be removed instead of being made invisible. The method goes to block S408, where it is determined if a source application has been found. A further description of block S408 is provided with reference to FIG. 6 below.

Figure 7C:
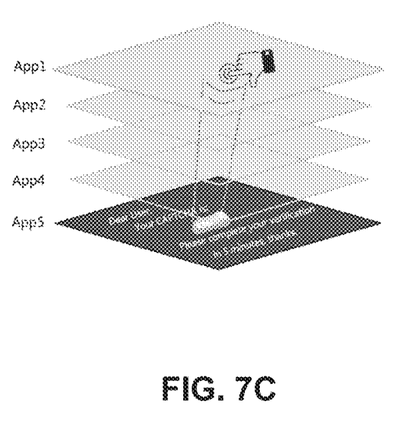

If the answer in block 408 is Yes, the method goes to block S410, in which one or more pieces of source content to be pasted on the source application, for example, "966031" shown in FIG. 7C, can be further determined, and the one or more pieces of source content can be pasted into the target area automatically in response only to the one or more pieces of source content being determined. Thus, the one or more pieces of source content can be pasted into the target area directly once the one or more pieces of source content are determined. In this way, the determined source content can be pasted directly without the need for receiving additional pasting instructions from the user.

Figure 7D:
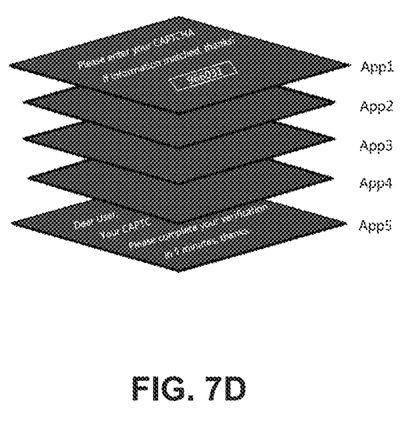

FIGS. 7C and 7D shows an example of pasting the source content to the target area directly with the stacked mode. In this way, the candidate source applications can be obtained and shown automatically, and the user only needs to select one or more pieces of source content. The selected one or more pieces of source content can be pasted directly, and the user can copy one or more pieces of source content directly from the source application without complex operation. A more convenient way for copy-paste operation with better user experience can, thus, be provided.

In some further embodiments, the user can select several pieces of source contents and paste them into the target area directly. For example, after completion of selecting a first source content in the source application, the first source content can be stored in memory 230, accordingly. In some further embodiments, the first source content can be stored in memory 230 by a special gesture, such as dragging the selected source content to any non-editable or non-writable area. Then the user can continue to select a second source content, and the second content will also be saved in memory 230 in this way.

In a further embodiment, after selecting a first source content in a first source application, the user can use a pre-defined gesture, such as clicking the screen three times, to trigger the stacked mode again and jump to a next obtained application directly. The user can continue to select one or more pieces of source content and save them in memory 230 automatically.

In some embodiments, some pre-defined ways could be used to determine if the selection is completed, such as, the user could click on a blank place twice. After the selection of source contents, the selected source contents would be pasted into the target area directly without complex operation. If the answer is No in block S408, the method goes to block S412, where all not-running applications can be obtained, and the method returns to block S406.

With reference to FIG. 6, a flowchart of an exemplary method 600 is shown for determining a target/source application according to certain embodiments of the present invention. The method 600 starts at block S602, in which a pointer can be created. The pointer can be set as P1 at first which points to App 1 among all paused/not-running applications App 1 . . . App N. In this way, App 1 pointed by the pointer becomes a current application.

In some embodiments, the current application can turn to a normal display mode from an invisible mode. Then the user can determine if the current application is the target application in block S604. If the answer to block S604 is Yes, the method goes to block S606, where the current application becomes active. The method 600 ends here.

If the answer to block S604 is No, the method goes to block S608, a determination P.next=Pn+1 is made, wherein n is the number of all obtained applications, and P.next indicates the next value of the pointer. For example, if the current pointer is P1, then the P.next here becomes P2. Thus if the number of all obtained applications is 9, then Pn+1 becomes P10. If the answer is Yes in block 608, which means all obtained applications have been checked, then method 600 ends. If the answer in block 608 is No, the value of the pointer P is set as P.next at block S610, and the method returns to block S604.

In a further embodiment, if the current application is not the target/source application, some pre-defined gestures can be used to switch to the next obtained application automatically. For example, the user can keep touching the screen exceeding a pre-defined period, or with pressure force reaching a pre-defined value or exceeding a pre-defined period with pressure force reaching a pre-defined value. In some embodiment, the previous application can be shown in an invisible mode, such as transparent or semi-transparent mode, and the current application can be shown in a normal mode. FIGS. 5C and 7C show two such examples.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state material of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical functions. In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
obtaining, by one or more processors, two or more candidate target applications in response to a selection of pieces of source content from two or more source applications;
determining, by the one or more processors, target applications from the two or more candidate target applications, wherein the two or more candidate target applications are shown one by one in a pre-defined order;
switching a current candidate target application to a next candidate target application, the switching comprising making the current candidate target application semi-transparent; and
automatically pasting, by the one or more processors, the pieces of source content into one or more target areas of at least two of the two or more candidate target applications in response to a determination of the one or more target areas of the at least two of the two or more candidate target applications and an action positively indicating that the selection of the pieces of source content is complete.

2. The method of claim 1, wherein the pre-defined order is determined based on at least one of: a length of latest active time of the two or more candidate target applications, an alphabetical order based on names of the two or more candidate target applications, or a relationship of the two or more candidate target applications and the two or more source applications.

3. The method of claim 2, wherein determining the target applications further comprises:
switching, by the one or more processors, a current candidate target application to a next candidate target application of the two or more candidate target applications by receiving a screen pressure exceeding a pre-defined duration threshold or a pre-defined pressure threshold; and
activating, by the one or more processors, the current candidate target application in response to determining the current candidate target application to be one of the target applications.

4. The method of claim 3, wherein switching the current candidate application to the next candidate target application further comprises: making, by the one or more processors, the current candidate target application invisible.

5. The method of claim 1, wherein the two or more candidate target applications are shown one by one in a pre-defined order stacked beneath the source applications.

6. A computer-implemented method, comprising:
obtaining, by one or more processors, two or more candidate source applications in response to determination of target areas of two or more target applications;
determining, by the one or more processors, a source application from the two or more candidate source applications, wherein the two or more candidate source applications are shown one by one in a pre-defined order;
switching, by the one or more processors, a current candidate source application to a next source application, the switching comprising making the current candidate source application semi-transparent; and
automatically pasting, by the one or more processors, one or more pieces of source content into the target areas of at least two of the two or more target applications in response to a selection of the one or more pieces of source content in the source applications and an action positively indicating that the selection of the one or more pieces of source content is complete, the action positively indicating that the selection of the one or more pieces of source content is complete being clicking on a blank place twice.

7. The method of claim 6, wherein the pre-defined order is determined based on at least one of: a length of latest active time of the two or more candidate source applications, an alphabetical order based on names of the two or more candidate source applications, or a relationship of the two or more candidate source applications and the two or more target applications.

8. The method of claim 6, wherein determining the source application further comprises:
switching, by the one or more processors, a current candidate source application to a next candidate source application of the two or more candidate source applications by receiving a screen pressure exceeding a pre-defined duration threshold or a pre-defined pressure threshold; and
activating, by the one or more processors, the current candidate source application in response to determining the current candidate source application to be the source application.

9. The method of claim 8, wherein switching the current candidate source application to the next candidate source application of the two or more candidate source applications further comprises: making, by the one or more processors, the current candidate source application invisible.

10. The method of claim 6, wherein the two or more candidate source applications are stacked one by one beneath the target applications in the pre-defined order.

11. A computer system, comprising:
a processor;
a computer-readable memory coupled to the processor, the memory comprising instructions that, when executed by the processor, cause the processor to:
obtain two or more candidate target applications in response to a selection of pieces of source content two or more source applications;
determine target applications from the two or more candidate target applications, wherein the two or more candidate target applications are shown one by one in a pre-defined order;
switch a current candidate target application to a next candidate target application, the switching comprising making the current candidate target application semi-transparent; and
automatically paste the pieces of source content into one or more target areas of at least two of the two or more candidate target applications in response to determination of the one or more target areas of the at least two of the two or more candidate target applications and an action positively indicating that the selection of the pieces of source content is complete.

12. The computer system of claim 11, wherein the pre-defined order is determined based on at least one of: a sequence of latest active time of the two or more candidate target applications, an alphabetical order based on names of the two or more candidate target applications, or a relationship of the two or more candidate target applications and the two or more source applications.

13. The computer system of claim 11, wherein the memory further comprises instructions that, when executed by the processor, cause the processor to:
switch a current candidate target application to a next candidate target application of the two or more candidate target applications by receiving a screen pressure exceeding a pre-defined duration threshold or a pre-defined pressure threshold; and
activate the current candidate target application in response to determining the current candidate target application to be one of the target applications.

14. A computer system, comprising:
a processor;
a computer-readable memory coupled to the processor, the memory comprising instructions that, when executed by the processor, cause the processor to:
obtain two or more candidate source applications in response to determining target areas of two or more target applications;
determine a source application from the two or more candidate source applications, wherein the two or more candidate source applications are shown one by one in a pre-defined order;
switch a current candidate source application to a next candidate source application, the switching comprising making the current candidate source application semi-transparent; and
automatically paste pieces of source contents into the target areas of at least two of the two or more target applications in response to a selection of the pieces of source content in the source application and an action positively indicating that the selection of the one or more pieces of source content is complete, the action positively indicating that the selection of the one or more pieces of source content is complete being clicking on a blank place twice.

15. The computer system of claim 14, wherein the pre-defined order is determined based on at least one of: a length of latest active time of the two or more candidate source applications, a sequence of latest active time of the two or more candidate source applications, an alphabetical order based on names of the two or more candidate source applications, or a relationship of the two or more candidate source applications and the target applications.

16. The computer system of claim 14, wherein the memory further comprises instructions that, when executed by the processor, cause the processor to:
switch a current candidate source application to a next candidate source application of the two or more candidate source applications by receiving a screen pressure exceeding a pre-defined duration threshold or a pre-defined pressure threshold; and
activate the current candidate source application in response to determining the current candidate source application to be one of the source applications.

17. A computer program product comprising a computer readable storage medium having a computer readable program stored therein, wherein the computer readable program, when executed on a computing device, causes the computing device to process of:
obtaining two or more candidate target applications in response to a selection of pieces of source content two or more source applications;
determining target applications from the two or more candidate target applications, wherein the two or more candidate target applications are shown one by one in a pre-defined order;
switching a current candidate target application to a next candidate target application, the switching comprising making the current candidate target application semi-transparent; and
automatically pasting the pieces of source content into one or more target areas of at least two of the two or more candidate target applications in response to a determination of the one or more target areas of the at least two of the two or more candidate target applications in and an action positively indicating that the selection of the pieces of source content is complete.

18. The computer program product of claim 17, wherein determining the target application further comprises:
switching a current candidate target application to a next candidate target application of the two or more candidate target applications by receiving a screen pressure exceeding a pre-defined duration threshold or a pre-defined pressure threshold in response to determining the current candidate target application not to be one of the target applications; and
activating the current candidate target application in response to determining the current candidate target application to be one of the target applications.

19. The computer program product of claim 18, wherein switching the current candidate application to the next candidate target application further comprises: making the current candidate target application invisible.

20. The computer program product of claim 17, wherein the two or more candidate target applications are stacked one by one beneath the source application in the pre-defined order.

* * * * *